United States Patent [19]

Croix

[11] 3,720,587

[45] March 13, 1973

[54] SEPARATING 1-CHLORO-2,2,2-TRIFLUORO-ETHYL DIFLUOROMETHYL ETHER FROM 1-CHLORO-2,2,2-TRIFLUOROETHYL DIFLUOROCHLORO-METHYL ETHER BY AZEOTROPIC DISTILLATION

[75] Inventor: Louise S. Croix, Summit, N.J.

[73] Assignee: Airco, Inc., New York, N.Y.

[22] Filed: Aug. 2, 1971

[21] Appl. No.: 168,399

[52] U.S. Cl. ................203/58, 203/62, 260/614 F, 260/616
[51] Int. Cl. ...............................................B01d 3/36
[58] Field of Search .........203/62, 58, 57; 260/614 F, 260/616

[56] References Cited

UNITED STATES PATENTS

| 3,535,388 | 10/1970 | Terrell | 260/614 F |
| 3,501,533 | 3/1970 | Anello et al. | 260/616 X |
| 3,406,099 | 10/1968 | Buckman et al. | 203/62 X |
| 3,282,801 | 11/1966 | Wiist | 203/62 X |
| 2,442,589 | 6/1948 | Evans et al. | 203/62 |

Primary Examiner—Norman Yudkoff
Assistant Examiner—David Edwards
Attorney—Roger M. Rathbun et al.

[57] ABSTRACT

Azeotropes of 1-chloro-2,2,2-trifluoroethyl difluoromethyl ether and acetone, methyl ethyl ketone or tetrahydrofuroan are formed and used to separate this ether from 1-chloro-2,2,2-trifluoroethyl difluorochloromethyl ether.

8 Claims, No Drawings

SEPARATING 1-CHLORO-2,2,2-TRIFLUORO-ETHYL DIFLUOROMETHYL ETHER FROM 1-CHLORO-2,2,2-TRIFLUOROETHYL DIFLUOROCHLORO-METHYL ETHER BY AZEOTROPIC DISTILLATION

This invention relates to the purification of 1-chloro-2,2,2-trifluoroethyl difluoromethyl ether having the formula $CF_3CHCl-O-CHF_2$. More particularly, the invention concerns the purification of 1-chloro-2,2,2-trifluoroethyl difluoromethyl ether by separation from 1-chloro-2,2,2-trifluoroethyl difluorochloromethyl ether through the formation of an azeotrope of 1-chloro-2,2,2-trifluoroethyl difluoromethyl ether and acetone, methyl ethyl ketone or tetrahydrofuran. The invention is also directed to these azeotropes as new compositions of matter.

U. S. Pat. Nos. 3,535,388 and 3,535,425 describe the preparation of 1-chloro-2,2,2-trifluoroethyl difluoromethyl ether and methods for making this material which is useful, for instance, as an anesthetic. In one method of the manufacture of 1-chloro-2,2,2-trifluoroethyl difluoromethyl ether according to these patents, 2,2,2-trifluoroethyl difluoromethyl ether is chlorinated to obtain 1-chloro-2,2,2-trifluoroethyl difluoromethyl ether in admixture with other halogenated ethyl methyl ethers. Some of the halogenated ether by-products have boiling points sufficiently far from that of 1-chloro-2,2,2-trifluoroethyl difluoromethyl ether so that the latter can be separated by very careful fractional distillation. The by-products, 1-chloro-2,2,2-trifluoroethyl difluorochloromethyl ether ($CF_3CHCl-O-CF_2Cl$), however, co-distills with 1-chloro-2,2,2-trifluoroethyl difluoromethyl ether at about 2 percent concentration so the separation of the latter in high purity by distillation cannot be accomplished. Another means for separating 1-chloro-2,2,2-trifluoroethyl difluoromethyl ether from the other ethers is by vapor/liquid chromatography, but this type of operation is slow, expensive and not readily adaptable to preparing 1-chloro-2,2,2-trifluoroethyl difluoromethyl ether in commercially desirable quantities. Especially when 1-chloro-2,2,2-trifluoroethyl difluoromethyl ether is intended for use as an anesthetic, a purity greater than 99.95 percent is needed, and it is thus apparent that more desirable ways of purifying 1-chloro-2,2,2-trifluoroethyl difluoromethyl ether are needed.

In the method of the present invention, 1-chloro-2,2,2-trifluoroethyl difluoromethyl ether is separated from its mixture with 1-chloro-2,2,2-trifluoroethyl difluorochloromethyl ether by forming an azeotrope of 1-chloro-2,2,2-trifluoroethyl difluoromethyl ether with acetone, methyl ethyl ketone or tetrahydrofuran. The resulting maximum boiling point azeotropes boil sufficiently above the boiling point of 1-chloro-2,2,2-trifluoroethyl difluoromethyl ether, to enable the ready distillation from the azeotropes of the materials in the mixture which boil close to 1-chloro-2,2,2-trifluoroethyl difluoromethyl ether, especially 1-chloro-2,2,2-trifluoroethyl difluorochloromethyl ether. Often the by-product ethers are a minor part by weight of their mixture with 1-chloro-2,2,2-trifluoroethyl difluoromethyl ether.

The azeotrope of acetone and 1-chloro-2,2,2-trifluoroethyl difluoromethyl ether contains a molar ratio of acetone to 1-chloro-2,2,2-trifluoroethyl difluoromethyl ether of about 1.2:1 as determined by gas chromatography, and the azeotrope boils at a temperature of about 66°C. The azeotropes of 1-chloro-2,2,2-trifluoroethyl difluoromethyl ether and tetrahydrofuran and methyl ethyl ketone boil at about 68°C. and 81°C., respectively. The tetrahydrofuran azeotrope has a molar ratio of tetrahydro-furan to 1-chloro-2,2,2-trifluoroethyl difluoromethyl ether of about 3:1, while azeotrope of methyl ethyl ketone and 1-chloro-2,2,2-trifluoroethyl difluoromethyl ether contains the components in a molar ratio of about 5.5:1. These molar ratios are as determined by gas chromatography and the boiling points reported are at atmospheric pressure.

The fact that 1-chloro-2,2,2-trifluoroethyl difluoromethyl ether has been found to form these azeotropes offers a convenient way of separating the ether from close boiling materials which do not form similar boiling azeotropes with acetone, methyl ethyl ketone or tetrahydrofuran. The 1-chloro-2,2,2-trifluoroethyl difluoromethyl ether azeotropes are particularly useful in separating the ether from 1-chloro-2,2,2-trifluoroethyl difluorochloromethyl ether which appears as a minor byproduct, for instance, less than about 5percent and often at least about 1 percent by weight, in the product from synthesis of 1-chloro-2,2,2-trifluoroethyl defluoromethyl ether by the procedure noted above. These reaction products frequently contain about 85 to 98 percent of 1-chloro-2,2,2-trifluoroethyl difluoromethyl ether and may also include other by-product ethers which boil considerably below 1-chloro-2,2,2-trifluoroethyl difluoromethyl ether, and thus if desired these lower boiling ethers can be readily separated by distillation from the reaction mixture before formation of the azeotrope of this invention. Alternatively, these lower boiling products which are also usually present in minor amounts by weight can be removed from the 1-chloro- 2,2,2-trifluoroethyl difluoromethyl ether-containing reaction mixture after the formation of the azeotrope, unless the lower boiling materials form azeotropes with acetone, methyl ethyl ketone or tetrahydrofuran having boiling points close to the given azeotrope of 1-chloro-2,2,2-trifluoroethyl difluoromethyl ether.

In performing the separation of 1-chloro-2,2,2-trifluoroethyl difluoromethyl ether according to this invention, acetone, methyl ethyl ketone or tetrahydrofuran is used in an amount sufficient to form an azeotrope with a substantial portion of the 1-chloro-2,2,2-trifluoroethyl difluoromethyl ether present in its admixture with 1-chloro-2,2,2-trifluoroethyl difluorochloromethyl ether. In order to recover maximum amounts of 1-chloro-2,2,2-trifluoroethyl difluoromethyl ether it is normally desirable to combine at least sufficient of the acetone, methyl ethyl ketone or tetrahydrofuran to azeotrope substantially all of the 1-chloro-2,2,2-trifluoroethyl difluoromethyl ether present in the mixture to be treated. Large excesses of acetone, methyl ethyl ketone or tetrahydrofuran are not necessary and may serve to increase the cost of the operation. Generally, the amount of acetone, methyl ethyl ketone or tetrahydrofuran combined with the 1-chloro-2,2,2-trifluoroethyl difluoromethyl ether containing close boiling materials, is conveniently about 0.1 to 10 or more, preferably about 1 to 7, moles per mole of 1-chloro-2,2,2-trifluoroethyl difluoromethyl ether in the mixture to be separated, although as indicated above at least enough of the acetone, methyl ethyl ketone or tetrahydrofuran is preferably combined to azeotrope substantially all of the 1-chloro-2,2,2-trifluoroethyl difluoromethyl ether present. The preferred amount of acetone combined with the 1-chloro-2,2,2-trifluoroethyl difluoromethyl ether-containing mixture is about 0.3 to 3 moles of acetone per mole of this ether in the mixture treated, while similar preferred amounts in the case of tetrahydrofuran and methyl ethyl ketone are, respectively, about 2 to 5 and about 4 to 7 moles per mole of this desired ether in the mixture.

After combination of the acetone, methyl ethyl ketone or tetrahydrofuran with the 1-chloro-2,2,2-trifluoroethyl difluoromethyl ether mixture to be separated in accordance with this invention, the 1-chloro-2,2,2-trifluoroethyl difluorochloromethyl ether can be easily fractionally distilled from the mixture. The resulting 1-chloro-2,2,2-trifluoroethyl difluoromethyl ether azeotrope can then be treated to yield a highly pure, e.g. greater than 99.95% pure, 1-chloro-2,2,2-trifluoroethyl difluoromethyl ether product by separation from acetone, methyl ethyl ketone or tetrahydrofuran according to which of these latter materials has been employed to form the azeotrope. The azeotrope can be treated by water extracting the acetone, methyl ethyl ketone or tetrahydrofuran from the 1-chloro-2,2,2-trifluoroethyl difluoromethyl ether, but a more preferred procedure is to add water to the azeotrope, for instance, in an amount of about 0.5 to 5, preferably about 1 to 3, parts by weight of water per part of 1-chloro-2,2,2-trifluoroethyl difluoromethyl ether in the azeotrope. By subsequent fractional distillation relatively pure 1-chloro-2,2,2-trifluoroethyl difluoromethyl ether can be readily separated as an overhead vapor in high yields.

The present invention is further illustrated by the following examples:

EXAMPLES I-III

A crude mixture (2000 g.) of 1-chloro-2,2,2-trifluoroethyl difluoromethyl ether of the following composition as determined by vapor phase chromatography:

| % | Compound | Boiling Point, °C |
|---|---|---|
| 3.19 | $CF_3CH_2-O-CF_2Cl$ | 37 |
| 1.54 | $CF_3CH_2-O-CF_2H$ | 29 |
| 2.15 | $CF_3CHCl-O-CF_2Cl$ | 53 |
| 92.81 | $CF_3CHCl-O-CF_2H$ | 48.5 | was mixed with 864 g. acetone with noticeable evolution of heat when stirred. This mixture was distilled through a 50 plate fractionating column of protruded packing to separate a first cut (154 g.) (bp. 30°–59°C.) of acetone and all of the two impurities, $CF_3CH_2-O-CF_2Cl$ and $CF_3CH_2-O-CF_2H$. A second cut (bp. 60°–67C.) (449 g.) was collected, containing most of the $CF_3CHCl-O-CF_2Cl$, 60–70 percent acetone and a small quantity of $CF_3CHCl-O-CF_2H$. At the point where the concentration of $CF_3CHCl-O-CF_2Cl$ was less than 0.01 percent in both the pot and the distillate, the distillation was stopped, and 3000–4000 g. of water was added to the pot and the distillation resumed. There was then distilled overhead at 48°–49°C., 1299 g. of $CF_3CHCl-O-CF_2$ of greater than 99.95 percent purity. Similar separations can be made by substituting for the acetone, 4500 g. methyl ethyl ketone or 2500 g. tetrahydrofuran.

EXAMPLE IV

Composition of Acetone-$CF_3CHCl-O-CHF_2$ Azeotrope

When equal weight quantities of $CF_3CHCl-O-CHF_2$ and acetone were distilled on a small fractionating column, the boiling point passed that of $CF_3CHCl-O-CHF_2$ (48.5°C.) and some free acetone (56.5°C.) was the first cut. The boiling point then stabilized at 66°, $n_D^{20} = 1.3269$, with a composition of 46.8 percent acetone and 53.2 percent $CF_3CHCl-O-CHF_2$ (area percent by gas chromatography), 27.5 percent by weight acetone, 72.5 percent by weight $CF_3CHCl-O-CHF_2$, 1.2 to 1.0 molar ratio.

EXAMPLE V

Tetrahydrofuran - $CF_3CHCl-O-CHF_2$ Azeotrope

When a mixture of 2 parts by weight of tetrahydrofuran and 1 part by weight of $CF_3CHCl-O-CHF_2$ was distilled on a small fractionating column, a constant boiling fraction was obtained at 68°C., $n_D^{20} = 1.3660$. The composition by gas chromatography analysis was 65.7 percent tetrahydrofuran and 33.6 percent $CF_3CHCl-O-CHF_2$ (53.6 percent by weight tetrahydrofuran and 46.4 percent by weight $CF_3CHCl-O-CHF_2$, 3:1 molar ratio).

EXAMPLE VI

Methyl Ethyl Ketone - $CF_3CHCl-O-CHF_2$ Azeotrope

When equal parts by weight of methyl ethyl ketone and $CF_3CHCl-O-CHF_2$ were distilled on a small fractionating column, a constant boiling fraction was obtained at 81°C. The composition by gas chromatography analysis was 80.2 percent methyl ethyl ketone and 19.8 percent $CF_3CHCL-O-CHF_2$ (68.5 percent by weight methyl ethyl ketone and 31.5 percent by weight $CF_3CHCl-O-CHF_2$, 5.5:1 molar ratio).

It is claimed:

1. A method of separating 1-chloro-2,2,2-trifluoroethyl difluoromethyl ether from its mixture with 1-chloro-2,2,2-trifluoroethyl difluorochloromethyl ether which comprises combining said mixture with a member selected from the group consisting of acetone, methyl ethyl ketone and tetrahydrofuran to form a higher boiling azeotrope with 1-chloro-2,2,2-trifluoroethyl difluoromethyl ether, and distilling 1-chloro-2,2,2-trifluoroethyl difluorochloromethyl ether from said azeotrope.

2. The method of claim 1 in which the selected member is acetone.

3. The method of claim 1 in which the selected member is methyl ethyl ketone.

4. The method of claim 1 in which the selected member is tetrahydrofuran.

5. The method of claim 1 in which water is combined with said azeotrope after said distilling and 1-chloro-2,2,2-trifluoroethyl difluoromethyl ether is distilled from the mixture.

6. The method of claim 5 in which the selected member is acetone.

7. The method of claim 5 in which the selected member is methyl ethyl ketone.

8. The method of claim 5 in which the selected member is tetrahydrofuran.

* * * * *